Aug. 27, 1957 P. A. DAHLEN 2,804,524

RESETTABLE CONDITION RESPONSIVE DEVICE

Filed Jan. 3, 1956

INVENTOR.
PAUL A. DAHLEN
BY Woodling and Kraut,
atty.

United States Patent Office 2,804,524
Patented Aug. 27, 1957

2,804,524

RESETTABLE CONDITION RESPONSIVE DEVICE

Paul A. Dahlen, Mansfield, Ohio, assignor to Stevens Manufacturing Company, Inc.

Application January 3, 1956, Serial No. 557,109

11 Claims. (Cl. 200—138)

The invention relates in general to condition responsive devices such as those which are temperature responsive and which have operating portions which may mutually cooperate and which may have opposing conditions such as on and off conditions. This could be on and off conditions of a valve; and hence, the operating portions could be a valve member and a valve seat or the operating portions could be electrical contacts for electrical on and off conditions. Specifically, the invention relates to a single shaft adjustable control which is movable in two different paths to control two different functions. One path of movement may control an adjustment for the condition such as the temperature of the changing condition in the device, and the other path of movement may control a resetting movement for the device. As one specific example, the invention has been shown as incorporated into an electrical thermostat having contacts for mutual cooperation with a manual control knob being rotatable to adjust the temperature at which the thermostat is changed from the off to the on condition or vice versa, and the knob is also axially movable to reset the thermostat to its operating condition after it has been once moved out of the operating condition.

The prior art forms of condition responsive devices such as electrical thermostats included those thermostats which had a snap-acting link so that as the ambient temperature of the thermostat varied the snap link would snap over center thus changing the condition of the thermostat, for example, changing it from the off to the on condition. A rotatable adjustable device was provided to change the temperature setting of the thermostat, and a second control device was provided for resetting the thermostat to the operating condition. This might be an axially movable reset button which would act upon the snap link to return it to its operating position on one side of the center or neutral plane. Such a prior art form of thermostat, however, required two separate manual controls; and therefore, an object of the present invention is to provide a controllable device such as a thermostat with only a single control knob which will combine these two functions of adjustment and resetting movement.

Another object of the invention is to provide a thermostat with a single shaft control wherein a manually rotatable knob may control the temperature of operation of the thermostat and may also be axially moved to reset the thermostat to an operating condition.

Another object of the invention is to provide a snap-acting thermostat with a single control movable in two different paths with the two paths independently controlling the functions of adjustment of the thermostat and resetting movement for the snap-acting thermostat.

Another object of the invention is to provide a snap-acting thermostat with a rotatable adjustment screw for adjusting the temperature of the thermostat and providing an axially slideable reset stud for resetting the thermostat once it has snapped out of the operating condition, and further to include a single control connected by a drive train to both the adjustment screw and the reset stud.

Another object of the invention is to provide the aforementioned drive train of such construction that it remains in engagement from the control knob to the adjusting screw even though the reset stud is axially moved for the resetting movement of the thermostat.

Other objects and a fuller understanding of this invention may be had by referring to the following description and claims, taken in conjunction with the accompanying drawing, in which:

Figure 1:
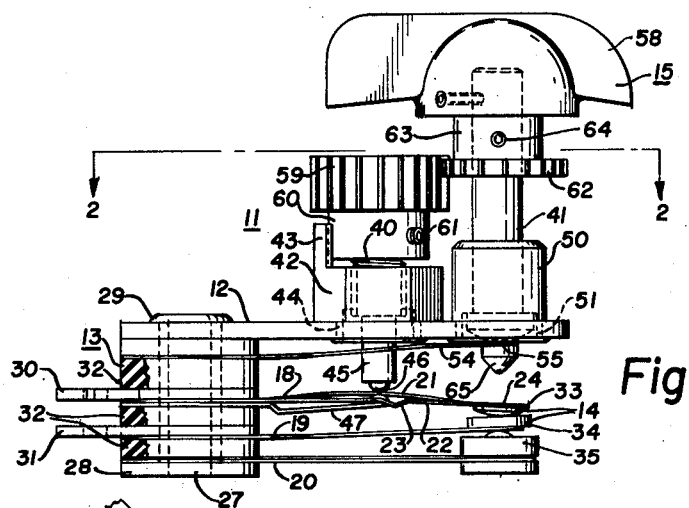
Figure 1 is a side elevational view of the invention embodied in a snap-acting thermostat.
Figure 2:
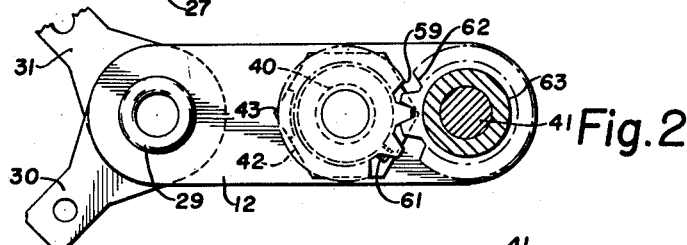
Figure 2 is a view on the line 2—2 of Figure 1.

The Figures 1 and 2 show a condition responsive device which is depicted as a temperature responsive device having operating portions which change from off to on conditions. Merely as an example but not by way of limitation, these Figures 1 and 2 show the invention specifically as being incorporated into an electrical thermostat 11 which generally includes a base 12, a stack 13, contacts 14 as the operating portions, and control means 15.

Figure 3:
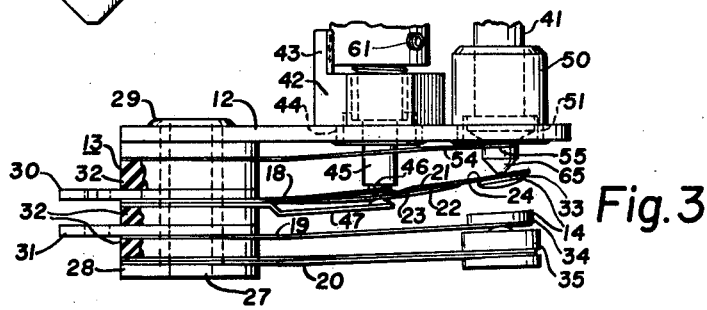
Figure 3 is a view similar to Figure 1 with the contacts in the open position.

The base 12 is preferably made of heavy gauge stock and carries the contacts 14 by means of contact strips carried in the stack 13. The stack 13 carries first and second contact strips 18 and 19 and a bimetallic strip 20. The first contact strip is a snap-acting over-center device which generally may be as shown in the Patent 2,692,317 to Edward Bletz for "Snap-Acting Thermostat," issued October 19, 1954. This snap-acting strip 18 generally includes three parallel strips with an inner compression strip 21 and two outer tension strips 22. These three strips 21 and 22 may all be formed from a single piece of metal, and the two outer tension strips 22 may be V-crimped at 23 or otherwise bent to effectively shorten these strips and thus mutually apply the tension and compression forces in the entire snap-acting strip 18. These mutually applied tension and compression forces assure that the outer end 24 of the strip 18 may snap up or down to positions on opposite sides of a center or neutral plane. The down position is as shown in Figure 1, and the up position is as shown in Figure 3. These are positions of static equilibrium.

The left ends of the three strips 18, 19, and 20 are mounted in the stack 13 on a hollow rivet 27 having a head 28 and spun or peened over at 29 onto the base 12 to hold the entire stack 13 together. A terminal 30 is disposed in the stack adjacent the contact strip 18, and a terminal 31 is adjacent the contact strip 19. Insulating washers 32 electrically insulate the contact strips 18 and 19 from each other and from the rest of the thermostat 11. The contacts 14 include a contact 33 on the outer end 24 of the contact strip 18 and another contact 34 on the outer end of the contact strip 19. These contacts 33 and 34 are in electrical engagement in the position shown in Figure 1. An insulator button 35 is provided on the outer end of the bimetallic strip 20 and is adapted to bear against the outer end of the contact strip 19 under normal temperature conditions and to move this contact 34 upwardly upon temperature variations in the desired sense, which may be either rising or falling temperatures.

The control means 15 is designed to control two different functions, the first being an adjustment of the condition to which the device is responsive, and the second being a resetting movement to reset the entire device. The control means 15 thus includes an adjustment screw 40 for adjusting the temperature of the thermostat and a reset stud 41 for resetting the thermostat to its operating condition. The adjusting screw 40 is threaded in a nut 42 which is fixedly attached to the base 12 and which includes a stop lug 43. The nut 42 is positioned over an aperture 44 in the base 12 so that the adjusting screw 40 may extend through this aperture. An insulating extension 45 of the adjusting screw 40 has a head 46 bearing against the snap-acting strip 18 and more specifically against the inner compression strip thereof. A spring strip abutment 47 is carried in the stack 13 to abut the inner compression strip 21 generally opposite the head 46. Thus, as the screw 40 is rotated, the insulating extension 45 moves axially in opposition to the force of the spring strip abutment 47. This provides an adjustable fulcrum or abutment for the snap-acting link 18 and thus varies the temperature at which the snap-acting link will snap to the other side of neutral as the outer end 24 is moved upwardly, as shown in Figure 1.

Figure 4:
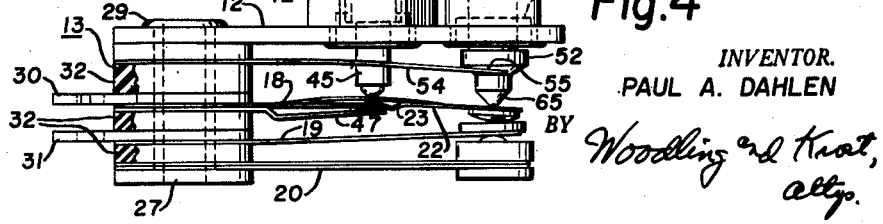
Figure 4 is a view similar to Figure 1 with the control knob moved to the resetting position.

The reset stud 41 is axially slideable and rotatable in a slide bearing 50 which is fixedly attached to the outer end of the base 12 at a second aperture 51. The reset stud 41 has an integral shoulder 52, as best seen in Figure 4, which cooperates with a recess 53 in the slide bearing 50. A spring strip 54 carried in the stack 13 has a forked end 55 engaging the reset stud 41 to urge it upwardly so that the shoulder 52 engages the bottom of the recess 53.

The upper end of the reset stud 41 fixedly carries a control knob 58 which is both rotatable and longitudinally movable on the rotational axis. A first relatively thick gear 59 is attached at the shoulder 60 by the set screw 61 to the upper end of the adjusting screw 40. The first gear 59 meshes with a second gear 62 of the same diameter and same number of teeth. This second gear is relatively thin and is fixedly attached at the shoulder 63 by a set screw 64 to the reset stud 41. The reset stud 41 and adjusting screw 40 are on parallel axes, and the knob 58 is, of course, coaxial with the reset stud 41. Rotation of the gear 59, and hence rotation of the knob 58, is limited by the set screw 61 engaging opposite sides of the stop lug 43 on the nut 42. The reset stud 41 carries an insulated end 65 for engagement with the contact strip 18, as best shown in Figures 3 and 4.

The engagement of the shoulder 52 with the bottom of the recess 53 under the urging of the spring strip 54 constitutes a first axial limit stop for defining the upper position of the reset stud 41. A second opposite axial limit stop for the reset stud 41 is provided generally by the relatively stiff bimetallic strip 20 when the parts 65, 33, 34, and 35 are in engagement as shown in Figure 4.

The operation of the thermostat 11 is well understood by those skilled in the art and includes generally a provision for adjustment of the temperature of the thermostat. The thermostat of Figures 1–4 has been shown as a normally closed type of electrical switch, that is, the contacts 33 and 34 are normally engaged under normal room temperatures. As the temperature changes, for example, if the temperature increases, the bimetallic strip 20 will be deflected upwardly to move the contact 34, and hence, the contact 33 upwardly. Sufficient upward movement causes the snap-action link 18 to snap over center to the position shown in Figure 3, which is an electrical off condition of the thermostat. Rotation of the knob 58 rotates the adjusting screw 40 through the drive train 62—59 and this varies the axial position of the abutment or fulcrum 46. If the fulcrum or head 46 is moved downwardly, the snap-acting link 18 will snap over center with a smaller temperature variation from normal. Once the thermostat is snapped over center to the position shown in Figure 3, then further temperature variations in either direction will not affect the electrical off condition of the thermostat even though the bimetallic strip 20 is flexed upwardly or downwardly, because of these temperature changes. The reset movement of the thermostat may then be employed, and the operator of the thermostat may move the knob 58 axially downwardly. The reset stud 41 thus axially slides within the slide bearing 50 to push the first contact strip 18 downwardly to the position shown in Figure 4. This engagement of the two contacts and the resistance to movement of the bimetallic strip 20 may be considered to be a second axial limit stop of the reset stud 41. This reset movement places the snap-acting link 18 in a condition of static equilibrium on the other side of center or neutral to thus restore the thermostat to an operating condition.

The fixed connection of the knob 58 onto the reset stud 41 is a drive train which permits axial movement of the knob 58 to cause the axial reset movement of the contact 33. Also, the intermeshed gears 59 and 62 is a drive train which permits rotation of the control knob 58 to provide temperature adjustment of the thermostat 11; namely, the temperature at which the snap link 18 changes from the on to the off condition. The fact that the first gear 59 is relatively thick in comparison with the second gear 62, plus the positioning of the second gear 62 near the top of the first gear 59 when the first axial limit stop is engaged, assures a structure wherein the gears remain in mesh even though the reset stud 41 is axially moved to the second axial limit stop. This is desirable to prevent the drive train between the control knob and the adjusting screw from becoming disengaged. It will thus be noted that the entire drive train between the control knob 58 and the adjusting screw 40 and reset stud 41 remains in engagement at all times despite either the rotational or the axial movement of the control knob 58.

Figure 5:
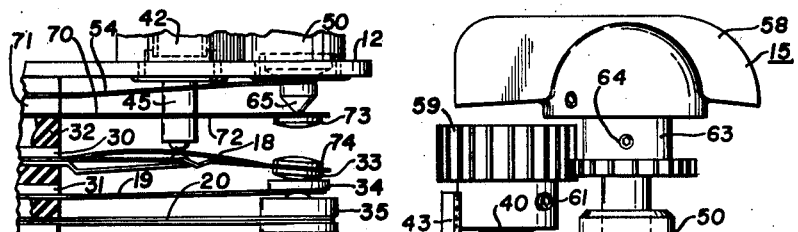
Figure 5 is a partial view of a modified form of the invention.

The Figure 5 shows a modification which is a double throw electrical switch construction. The stack 13 contains an extra contact strip 70 in engagement with a terminal 71 in the stack 13 and further insulated by another one of the insulator washers 32. The insulating extension 45 of the adjusting screw passes through an aperture 72 in this contact strip 70, again to abut the contact strip 18. The outer end of the contact strip 70 carries an extra contact 73 to mutually cooperate with a contact 74 carried on the upper side of the contact strip 18.

With this double throw switch construction shown in Figure 5, the contacts 33 and 34 will provide the same function as in the thermostat of Figures 1–4 which is a normally closed switch function. The contacts 73 and 74 will provide a normally open switch function, that is, as the bimetallic strip 20 is flexed upwardly, for example, by increasing temperatures, a temperature will be reached at which the snap-acting link 18 snaps over center to open the contacts 33—34 and close the contacts 73—74. Downward axial movement of the reset stud 41 will again cause a resetting movement to the entire thermostat generally as described above by returning the snap-acting link 18 to the position shown in this Figure 5.

The invention provides a single control knob which is capable of performing two different functions; namely, the function of adjustment of the operating condition of the condition responsive device or thermostat, and also the function of resetting the thermostat to its operating condition. These two functions are established by movement of the control knob in two different paths with a first path begin rotation of the knob for adjustment of the temperature and a second path being axial movement of the knob for a resetting movement.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable temperature manual reset thermostat, comprising, a base, first and second cooperating electrical contacts carried by said base and having engaged and disengaged conditions for electrical on and off conditions of said thermostat, a snap-acting over-center device acting on said first contact, thermally responsive means acting to relatively move said first and second contacts toward one of said on and off conditions upon temperature changes in a given sense, a rotatable adjustment member carried by said thermostat and cooperating therewith to establish adjustable abutment means for said over-center device to thus adjust the temperature of over-center snap movement for establishing said one of said on and off conditions, a reset stud rotatable and axially slidable in said base on an axis displaced from said rotatable adjustment member, first and second stops limiting axial movement of said reset stud to first and second positions with said first position being an operating position of said thermostat and said second position being a reset position to reset said over-center device to a position on one side of center and thus reset said thermostat to the other of said on and off conditions, manual control means rotatable and axially movable, and a drive train including first and second gears interconnecting said manual control means and said reset stud and rotatable adjustment member to provide axial movement to said reset stud and only rotation to said adjustment member whereby said drive train remains engaged even though said reset stud is axially moved from said first to said second position for resetting said over-center device.

2. An adjustable temperature manual reset thermostat, comprising, a base, first and second cooperating electrical contacts carried by said base and having engaged and disengaged conditions for electrical on and off conditions of said thermostat, a snap-acting over-center device acting on said first contact, thermally responsive means acting on one of said contacts to relatively move said first and second contacts toward one of said on and off conditions upon temperature changes in a given sense, a rotatable adjustment member carried by said base with rotation thereof providing a transversely adjustable fulcrum of said over-center device relative to said base to thus adjust the temperature of over-center snap movement for establishing said one of said on and off conditions, a slide bearing fixed to said base and having an axis substantially parallel to said adjustment member, a reset stud rotatable and axially slidable in said slide bearing, a drive train transmitting only rotational movement of said reset stud to said adjustment member, first and second stops limiting axial movement of said reset stud to first and second positions with said first position being an operating position of said thermostat and said second position being a reset position to reset said over-center device to a position on one side of center and thus reset said thermostat to the other of said on and off conditions, a spring urging said reset stud toward said first axial limit stop, and said drive train remaining in mesh to transmit rotational movement even though said reset stud is axially moved from said first to said second position for resetting said over-center device.

3. An adjustable temperature manual reset thermostat, comprising, a base, a bimetallic strip carried by said base, first and second cooperating electrical contacts carried by said base and having engaged and disengaged conditions for electrical on and off conditions of said thermostat, a snap-acting over-center device acting on said first contact, means acting between said bimetallic strip and one of said contacts to relatively move said first and second contacts toward one of said on and off conditions upon temperature changes in a given sense, a threaded adjustment screw threaded in said base and disposed to coact with said over-center device to act as an adjustable fulcrum thereon to thus adjust the temperature of over-center snap movement for establishing said one of said on and off conditions, a first gear fixed to said adjusting screw, a slide bearing fixed to said base and having an axis substantially parallel to said screw, a cylindrical reset stud rotatable and axially slidable in said slide bearing, first and second stops limiting axial movement of said reset stud to first and second positions with said first position being an operating position of said thermostat and said second position being a reset position to reset said over-center device to a position on one side of center and thus reset said thermostat to the other of said on and off conditions, a spring urging said reset stud toward said first axial limit stop, a second gear fixed to said reset stud and in mesh with said first gear, one of said gears having sufficient thickness and said first and second stops limiting axial movement of said reset stud to positions whereat said first and second gears remain in mesh even though said reset stud and second gear are axially moved from said first to said second position for resetting said over-center device.

4. An adjustable temperature manual reset thermostat, comprising, a base, first and second contact strips and a bimetallic strip carried by said base, first and second cooperating electrical contacts on said first and second contact strips, respectively, and having engaged and disengaged conditions for electrical on and off conditions of said thermostat, means to establish said first contact strip as a snap-acting over-center device, means acting between said bimetallic strip and one of said contact strips to relatively move said first and second contacts toward one of said on and off conditions upon temperature changes in a given sense, a threaded adjustment screw threaded in said base, and disposed to coact with said first contact strip to act as an adjustable fulcrum thereon to thus adjust the temperature of over-center snap movement of said first contact strip for establishing said one of said on and off conditions, a thick first gear fixed to said adjusting screw, a slide bearing fixed to said base and having an axis substantially parallel to said screw, a cylindrical reset stud rotatable and axially slidable in said slide bearing, first and second stops limiting axial movement of said reset stud to first and second positions with said first position being an operating position of said thermostat and said second position being a reset position to reset said first contact strip to a position on one side of center and thus reset said thermostat to the other of said on and off conditions, a spring urging said reset stud toward said first axial limit stop, a thin second gear fixed to said reset stud and in mesh with said first gear, a knob fixed on the remote end of said reset stud, said first gear having sufficient thickness and said first and second stops limiting axial movement of said reset stud to positions whereat said first and second gears remain in mesh even though said reset stud and second gear are axially moved from said first to said second position for resetting said first contact strip.

5. An adjustable temperature manual reset thermostat, comprising, a base, first and second contact strips and a bimetallic strip carried by said base, first and second cooperating electrical contacts on said first and second contact strips, respectively, and having engaged and disengaged conditions for electrical on and off conditions of said thermostat, tension and compression pieces included in said first contact strip to mutually apply tension and compression forces longitudinally of said first contact strip to establish said first contact strip as a snap-acting over-center device, insulator means acting between said bimetallic strip and one of said contact strips to relatively move said first and second contacts to one of said on and off conditions upon temperature changes in a given sense, a threaded adjustment screw threaded in said base on an axis substantially prependicular to said base and said strips, an insulator stud carried by said screw to abut a central region of said compression piece to act as an adjustable fulcrum thereon to thus adjust the temperature of over-center snap movement of said first contact strip for establishing said one of said on and off conditions, a thick first gear fixed to said adjusting screw, a slide bearing fixed to said base and having an axis substantially parallel to said screw, a cylindrical reset stud rotatable and axially slidable in said slide bearing, an insulator stud carried on said reset stud, first and second stops limiting axial movement of said reset stud to first and second positions with said first position being an operating position of said thermostat and said second position being a reset position to reset said first contact strip to a position on one side of center and thus reset said thermostat to the other of said on and off conditions, a leaf spring carried by said base and engaging said reset stud for urging same toward said first axial limit stop, a thin second gear fixed to said reset stud having the same number of teeth as said first gear and in mesh therewith, a knob fixed on the remote end of said reset stud, said first gear having sufficient thickness and said first and second stops limiting axial movement of said reset stud to positions whereat said first and second gears remain in mesh even though said second gear and reset stud are axially moved from said first to said second position for resetting said first contact strip.

6. An adjustable temperature manual reset thermostat, comprising, a base, first and second contact strips and a bimetallic strip carried by said base, first and second cooperating electrical contacts on said first and second contact strips, respectively, tension and compression pieces included in said first contact strip to mutually apply tension and compression forces longitudinally of said first contact strip to establish said first contact strip as a snap-acting over-center device, insulator means acting between said bimetallic strip and said second contact strip to move said second contact toward said first contact upon temperature changes in a given sense, a threaded adjustment screw threaded in said base on an axis substantially perpendicular to said base and said strips, an insulator stud carried by said screw to abut a central region of said compression piece to act as an adjustable fulcrum thereon to thus adjust the temperature of over-center snap movement of said first contact strip away from said second contact strip and thus adjust the electrical off condition of said thermostat, a thick first gear fixed to said adjusting screw, a slide bearing fixed to said base and having an axis substantially parallel to said screw, a cylindrical reset stud rotatable and axially slidable in said slide bearing, an insulator stud carried on said reset stud, first and second stops limiting axial movement of said reset stud to first and second positions with said first position being an operating position of said thermostat and said second position being a reset position to be engageable with said first contact strip to reset same to a position on one side of center and thus reset said thermostat to an electrical on condition, a leaf spring carried by said base and engaging said reset stud for urging same toward said first axial limit stop, a thin second gear fixed to said reset stud having the same number of teeth as said first gear and in mesh therewith, a knob fixed on the remote end of said reset stud, said first gear having sufficient thickness and said first and second stops limiting axial movement of said reset stud to positions whereat said first and second gears remain in mesh even though said second gear and reset stud are axially moved from said first to said second position for resetting said first contact strip.

7. An adjustable temperature manual reset thermostat, comprising, an elongated base having first and second ends and first and second sides, a stack fastened on said first side at said first end of said base, first and second contact strips and a bimetallic strip positioned in the order named and each having first and second ends with said first ends fastened in said stack and each strip extending substantially parallel to said base, first and second cooperating electrical contacts on the second ends of said first and second contact strips, respectively, tension and compression pieces included in said first contact strip to mutually apply tension and compression forces longitudinally of said first contact strip to establish said first contact strip as a snap-acting over-center device, an insulator button carried by the second end of said bimetallic strip to engage and move said second contact strip toward said first contact upon temperature changes in a given sense, first and second apertures in said base, a nut secured to said second side of said base at said first aperture, a threaded adjustment screw threaded in said nut on an axis substantially perpendicular to said base and said strips, an insulator stud carried by said screw and extending through said first aperture to abut a central region of said compression piece to act as an adjustable fulcrum thereon to thus adjust the temperature of over-center snap movement of said first contact strip away from said second contact strip and thus adjust the electrical off condition of said thermostat, a thick first gear fixed to said adjusting screw, a slide bearing fixed to said second side near said second end of said base and having an axis substantially parallel to said screw, a cylindrical reset stud rotatable and axially slidable in said slide bearing, an insulator stud carried on said reset stud and extending through said second aperture, first and second stops limiting axial movement of said reset stud to first and second positions with said first position being an operating position of said thermostat and said second position being a reset position to be engageable with said second end of said first contact strip to reset same to a position on one side of center and thus reset said thermostat to an electrical on condition, a leaf spring carried in said stack and engaging said reset stud for urging same toward said first axial limit stop, a thin second gear fixed to said reset stud having the same number of teeth as said first gear and in mesh therewith, a knob fixed on the remote end of said reset stud, and the distance between said first and second axial limit positions being approximately equal to the difference in thickness of said first and second gears whereby said first and second gears remain in mesh even though said reset stud and second gear are axially moved from said first to said second position for resetting said first contact strip.

8. A thermostat, comprising, first and second cooperating electrical contacts, snap-acting and temperature responsive means acting to relatively move said first and second contacts toward one of on and off conditions upon temperature changes in a given sense, a rotatably adjustable fulcrum for said snap-acting means to adjust the temperature of snap movement for establishing said one of said on and off conditions, a slide bearing having an axis substantially parallel to and displaced from said adjustable fulcrum, a reset stud rotatable and axially slidable in said slide bearing, first and second axial positions of said reset stud with said first position being an operating position of said thermostat and said second position being a reset position to reset said snap-acting means to a position on one side of center and thus reset said thermostat to the other of said on and off conditions, means urging said reset stud toward said first axial position, and constantly meshed gearing interconnecting said adjustable fulcrum and said reset stud even though said reset stud and said adjustable fulcrum are relatively axially moved from said first to said second position for resetting said snap-acting means.

9. A thermostat, comprising, first and second cooperating electrical contacts, snap-acting and bimetallic means acting to relatively move said first and second contacts toward one of on and off conditions upon temperature changes in a given sense, a rotatably adjustable fulcrum for said snap-acting means to adjust the temperature of snap movement for establishing said one of said on and off conditions, a first gear fixed to said adjustable fulcrum, a slide bearing having an axis substantially parallel to said adjustable fulcrum, a reset stud rotatable and axially slidable in said slide bearing, first and second axial positions of said reset stud with said first position being an operating position of said thermostat and said second position being a reset position to reset said snap-acting means to a position on one side of center and thus reset said thermostat to the other of said on and off conditions, spring means urging said reset stud toward said first axial position, a second gear fixed to said reset stud and in mesh with said first gear, one of said gears having sufficient thickness and said first and second positions of said reset stud establishing said first and second gears constantly in mesh even though said reset stud and second gear are axially moved from said first to said second position for resetting said snap-acting means.

10. An adjustable temperature manual reset thermostat, comprising, a bimetallic element, first and second cooperating electrical contacts, a snap-acting over-center device acting together with said bimetallic element to relatively move said first and second contacts toward one of on and off conditions upon temperature changes in a given sense, a threadably adjustable fulcrum for said over-center device to adjust the temperature of over-center snap movement for establishing said one of said on and off conditions, a first gear fixed to said adjustable fulcrum, a slide bearing having an axis substantially parallel to said threaded fulcrum, a reset stud rotatable and axially slidable in said slide bearing, first and second axial positions of said reset stud with said first position being an operating position of said thermostat and said second position being a reset position to reset said over-center device to a position on one side of center and thus reset said thermostat to the other of said on and off conditions, spring means urging said reset stud toward said first axial position, a second gear fixed to said reset stud and in mesh with said first gear, one of said gears having sufficient thickness and said first and second positions of said reset stud establishing said first and second gears constantly in mesh even though said reset stud and second gear are axially moved from said first to said second position for resetting said over-center device.

11. An adjustable temperature manual reset thermostat, comprising, a base, a bimetallic element carried by said base, first and second cooperating electrical contacts carried by said base and having engaged and disengaged conditions for electrical on and off conditions of said thermostat, a snap-acting over-center device acting together with said bimetallic element to relatively move said first and second contacts toward one of said on and off conditions upon temperature changes in a given sense, a threaded adjustment screw threaded in said base and disposed to coact with said over-center device to act as an adjustable fulcrum thereon to thus adjust the temperature of over-center snap movement for establishing said one of said on and off conditions, a first gear fixed to said adjusting screw, a slide bearing fixed to said base and having an axis substantially parallel to said screw, a cylindrical reset stud rotatable and axially slidable in said slide bearing, first and second axial positions of said reset stud with said first position being an operating position of said thermostat and said second position being a reset position to reset said over-center device to a position on one side of center and thus reset said thermostat to the other of said on and off conditions, spring means urging said reset stud toward said first axial position, a second gear fixed to said reset stud and in mesh with said first gear, one of said gears having sufficient thickness and said first and second positions of said reset stud establishing said first and second gears constantly in mesh even though said reset stud and second gear are axially moved from said first to said second position for resetting said over-center device.

References Cited in the file of this patent
UNITED STATES PATENTS

| | | |
|---|---|---|
| 2,032,136 | Lee | Feb. 25, 1936 |
| 2,692,317 | Bletz | Oct. 19, 1954 |
| 2,741,682 | Schwaneke et al. | Apr. 10, 1956 |